United States Patent [19]

Levecque et al.

[11] 4,146,378

[45] Mar. 27, 1979

[54] FIBER FORMATION BY USE OF GAS BLAST ATTENUATION

[76] Inventors: Marcel Levecque, Flowing Springs Rd., Birchrunville, Pa. 19421; Jean A. Battigelli, 17, rue Edouard Vaillant; Dominique Plantard, 16 Route de Mouy, both of 60 Rantigny, France

[21] Appl. No.: 897,045

[22] Filed: Apr. 17, 1978

Related U.S. Application Data

[63] Continuation-in-part of Ser. No. 834,543, Sep. 19, 1977, Ser. No. 834,540, Sep. 19, 1977, Ser. No. 834,537, Sep. 19, 1977, Ser. No. 780,589, Jan. 24, 1977, Pat. No. 4,070,173, and Ser. No. 762,789, Jan. 25, 1977, Pat. No. 4,012,662, said Ser. No. 780,589, and Ser. No. 762,789, is a continuation-in-part of Ser. No. 676,755, Apr. 14, 1976, Pat. No. 4,118,213, said Ser. No. 676,755, is a continuation-in-part of Ser. No. 557,282, Mar. 11, 1975, Pat. No. 4,015,964, which is a continuation-in-part of Ser. No. 353,984, Apr. 24, 1973, Pat. No. 3,885,940.

[51] Int. Cl.² ............................................. C03B 37/04
[52] U.S. Cl. ............................................. 65/5; 65/16; 264/5; 264/12; 264/176 F; 425/7

[58] Field of Search ............... 65/5, 16; 264/5, 176 F; 425/12, 7

[56] References Cited

U.S. PATENT DOCUMENTS

| 3,352,653 | 11/1967 | Speth | 65/16 X |
| 3,874,886 | 4/1975 | Levecque et al. | 65/5 X |

FOREIGN PATENT DOCUMENTS

| 59505 | 6/1938 | Norway | 65/16 |
| 392014 | 1/1974 | U.S.S.R. | 65/16 |

*Primary Examiner*—Robert L. Lindsay, Jr.
*Attorney, Agent, or Firm*—John T. Synnestvedt; Kenneth P. Synnestvedt

[57] ABSTRACT

Method and equipment are disclosed for forming fibers from attenuable material, such as molten glass, by the use of a jet penetrating transversely into a blast and by the of a structural element positioned adjacent to the path of the jet for establishing a stable low pressure zone in the jet flow into which the material to be attenuated is introduced. The jet has a temperature lower than that of the blast and preferably close to ambient temperature to thereby avoid erosion of the structural element positioned adjacent to the jet path.

5 Claims, 14 Drawing Figures

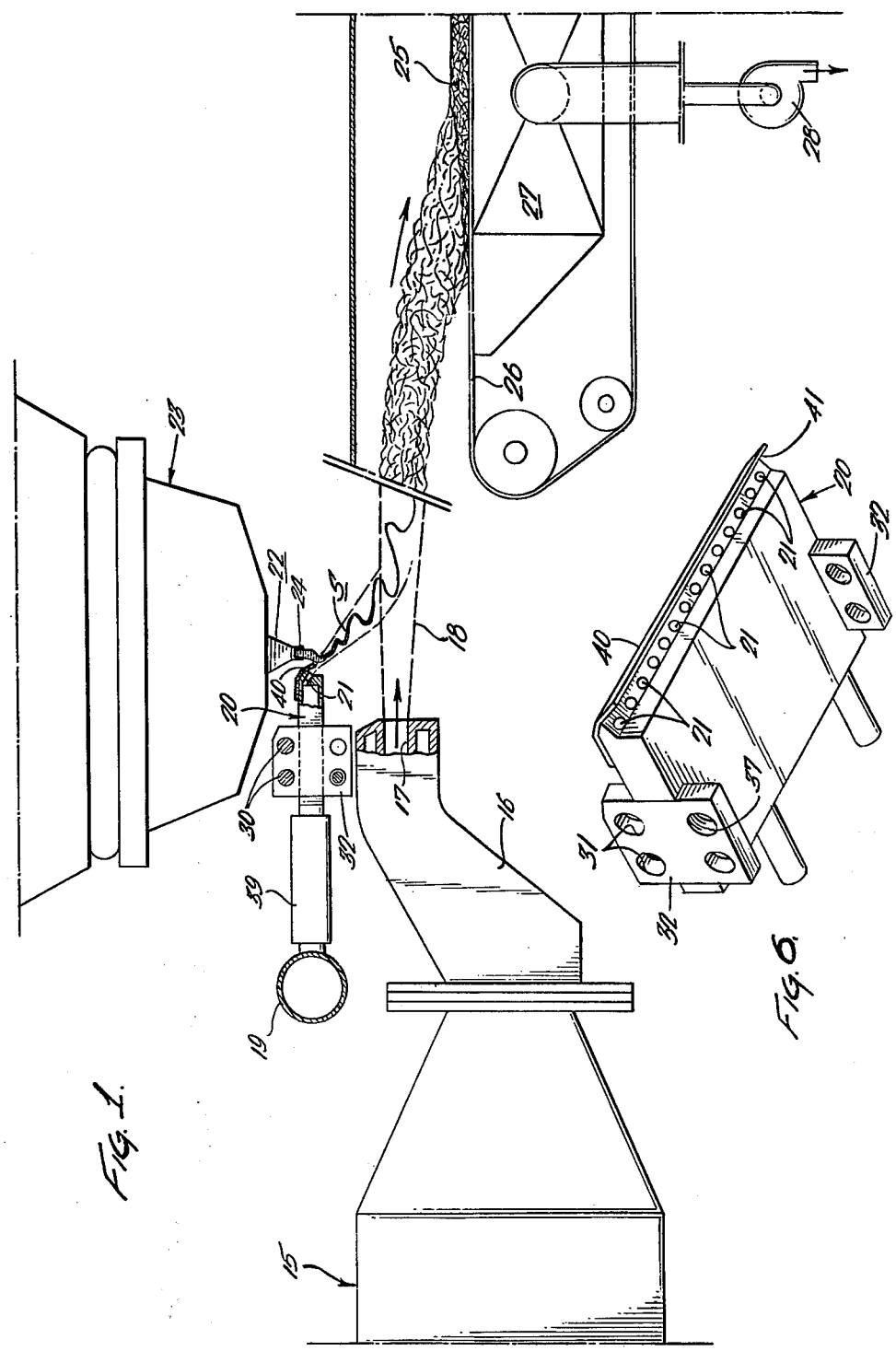

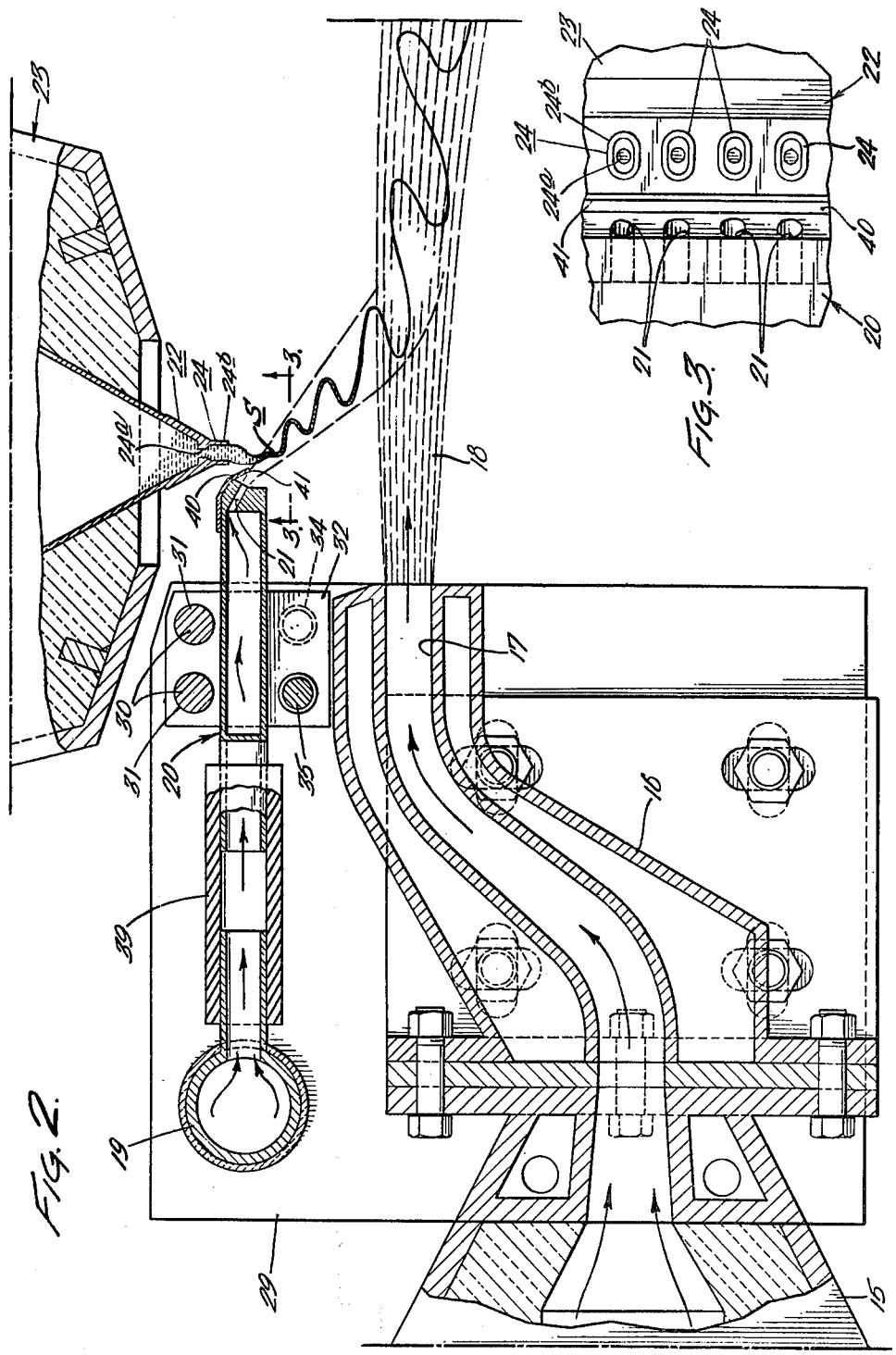

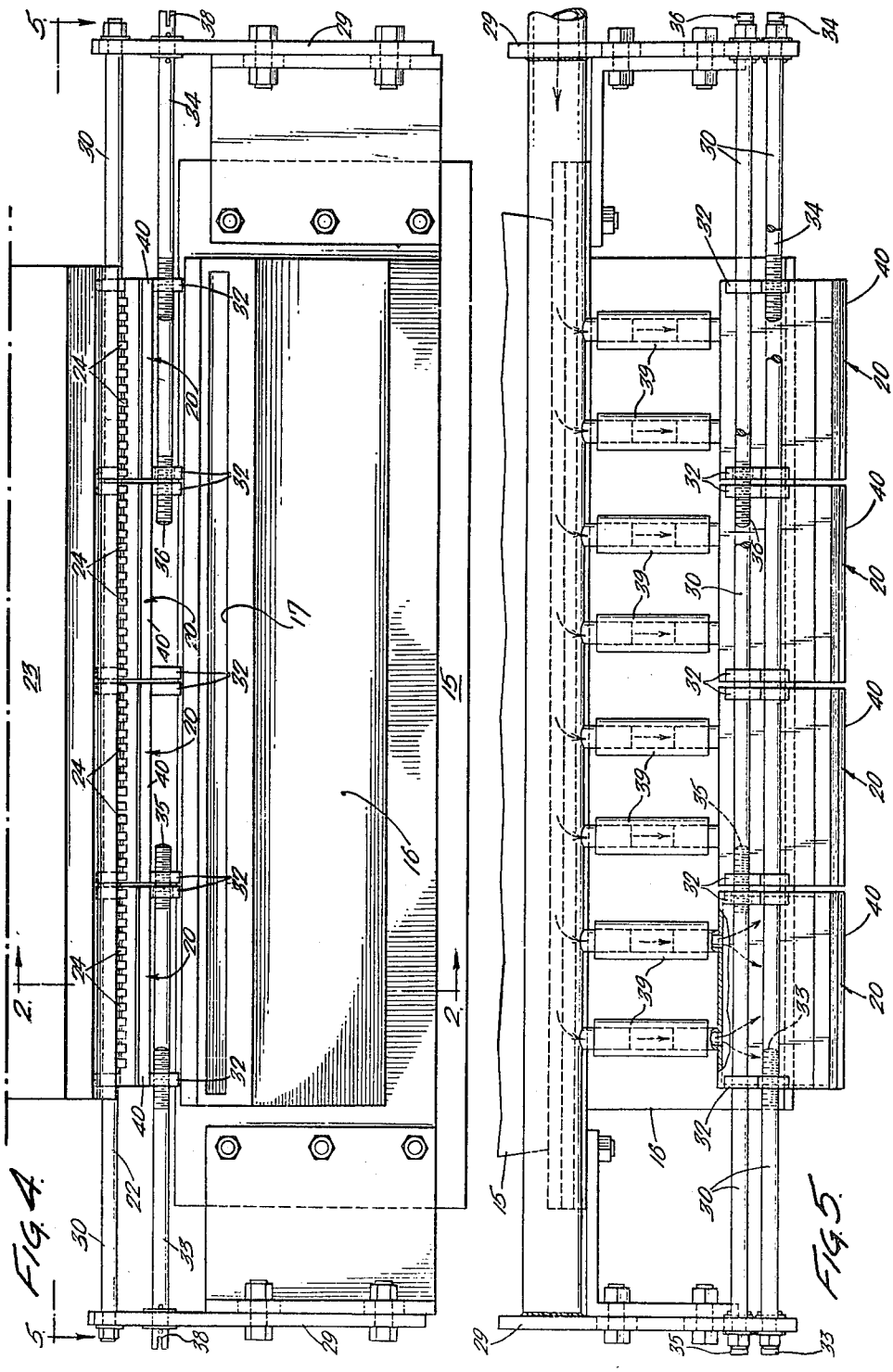

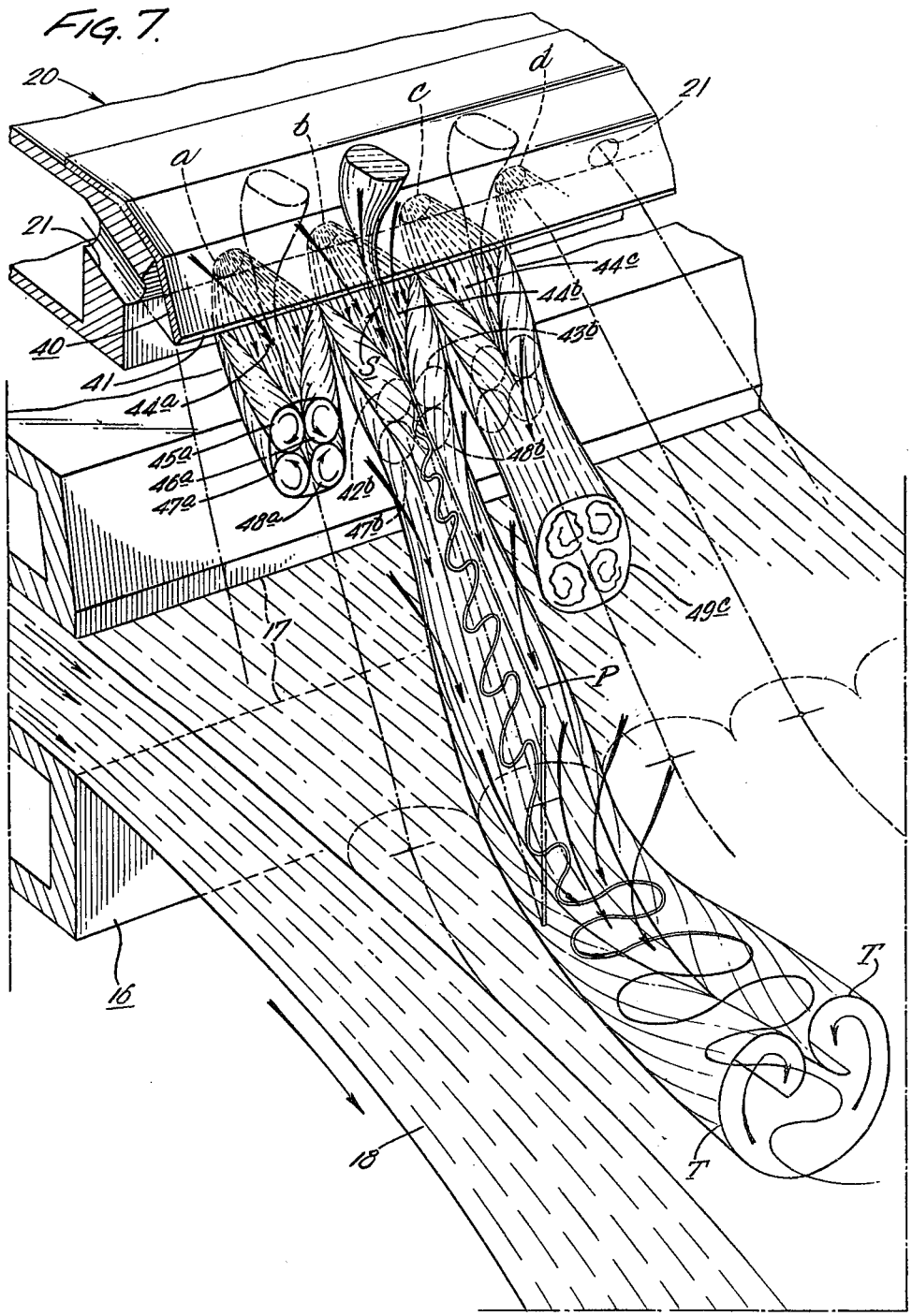

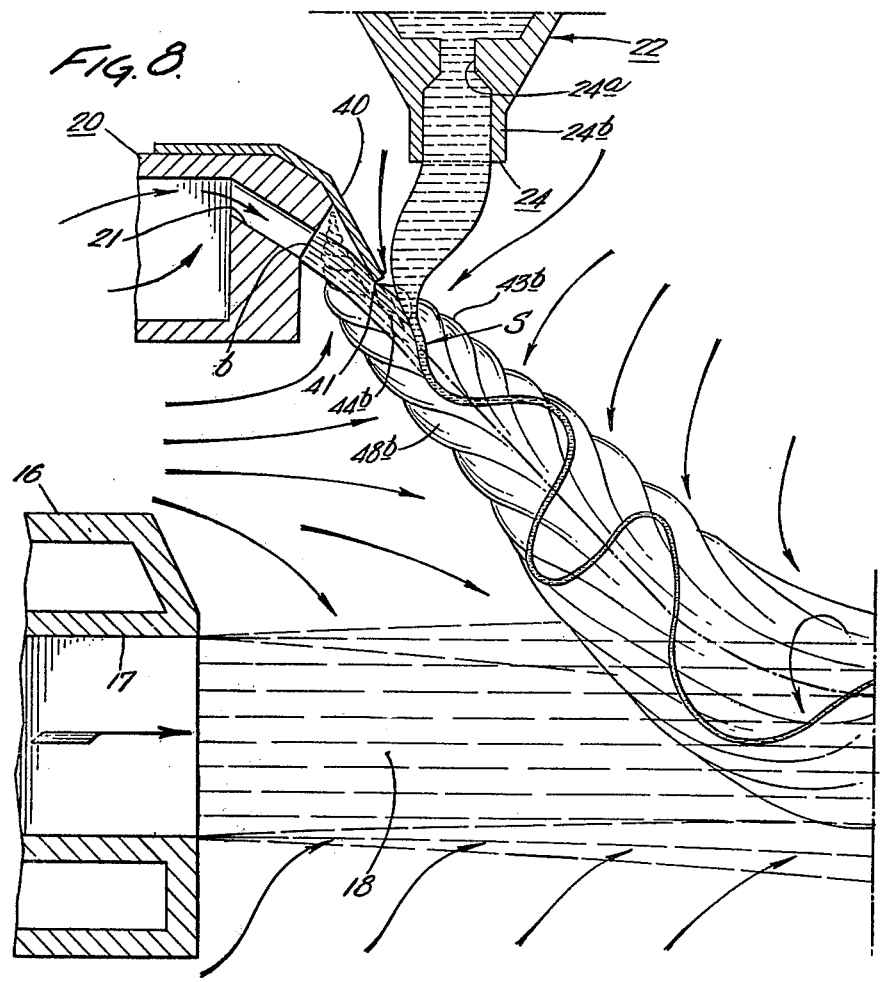
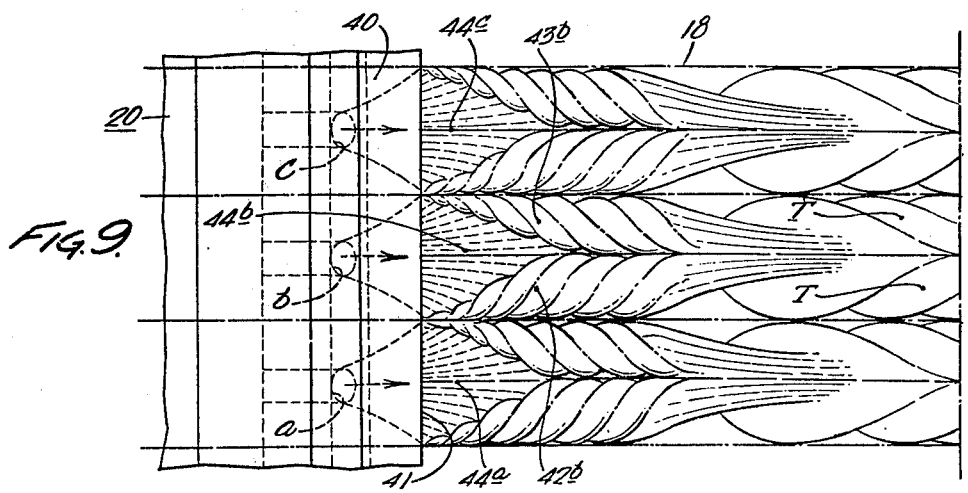

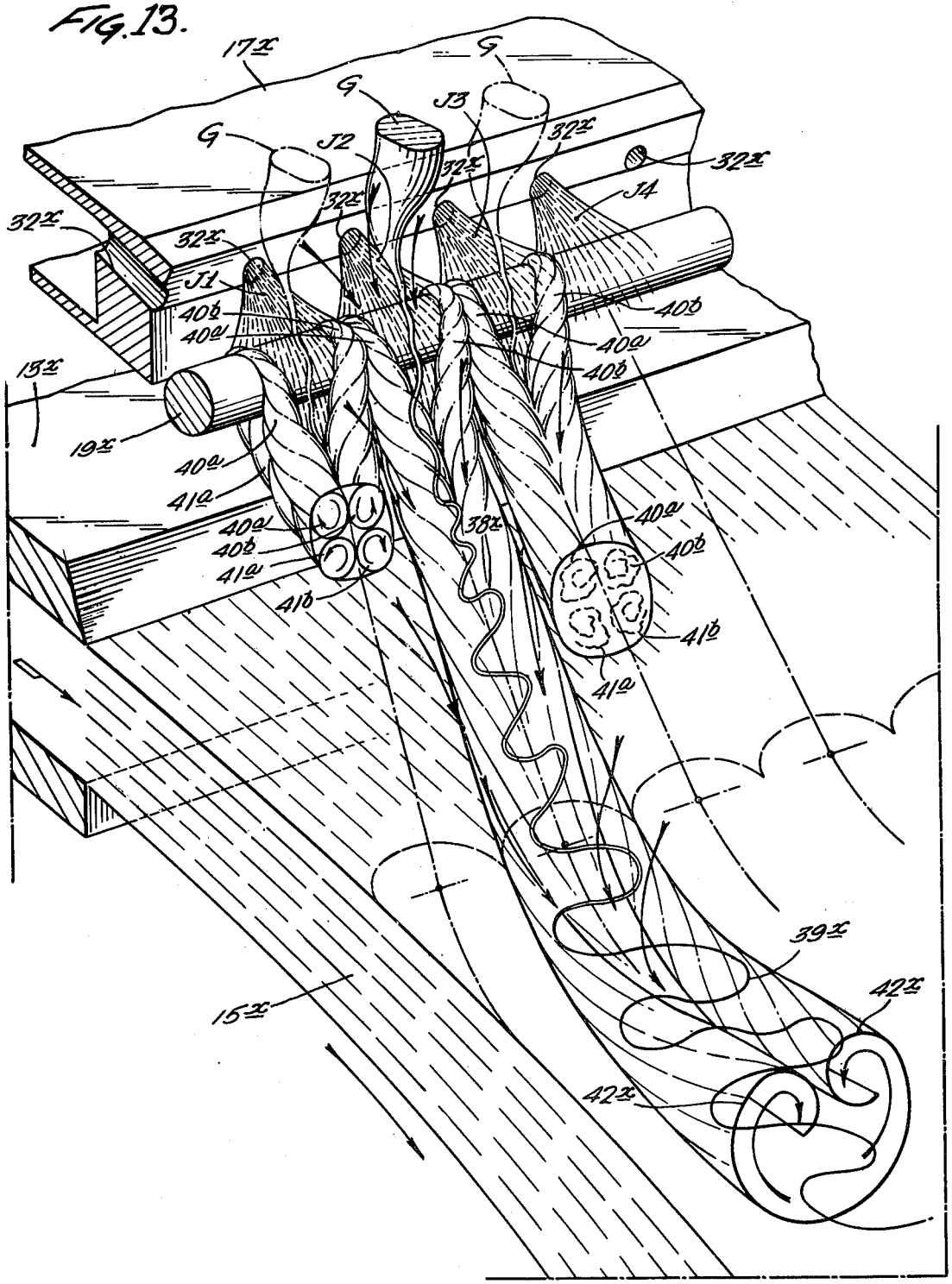

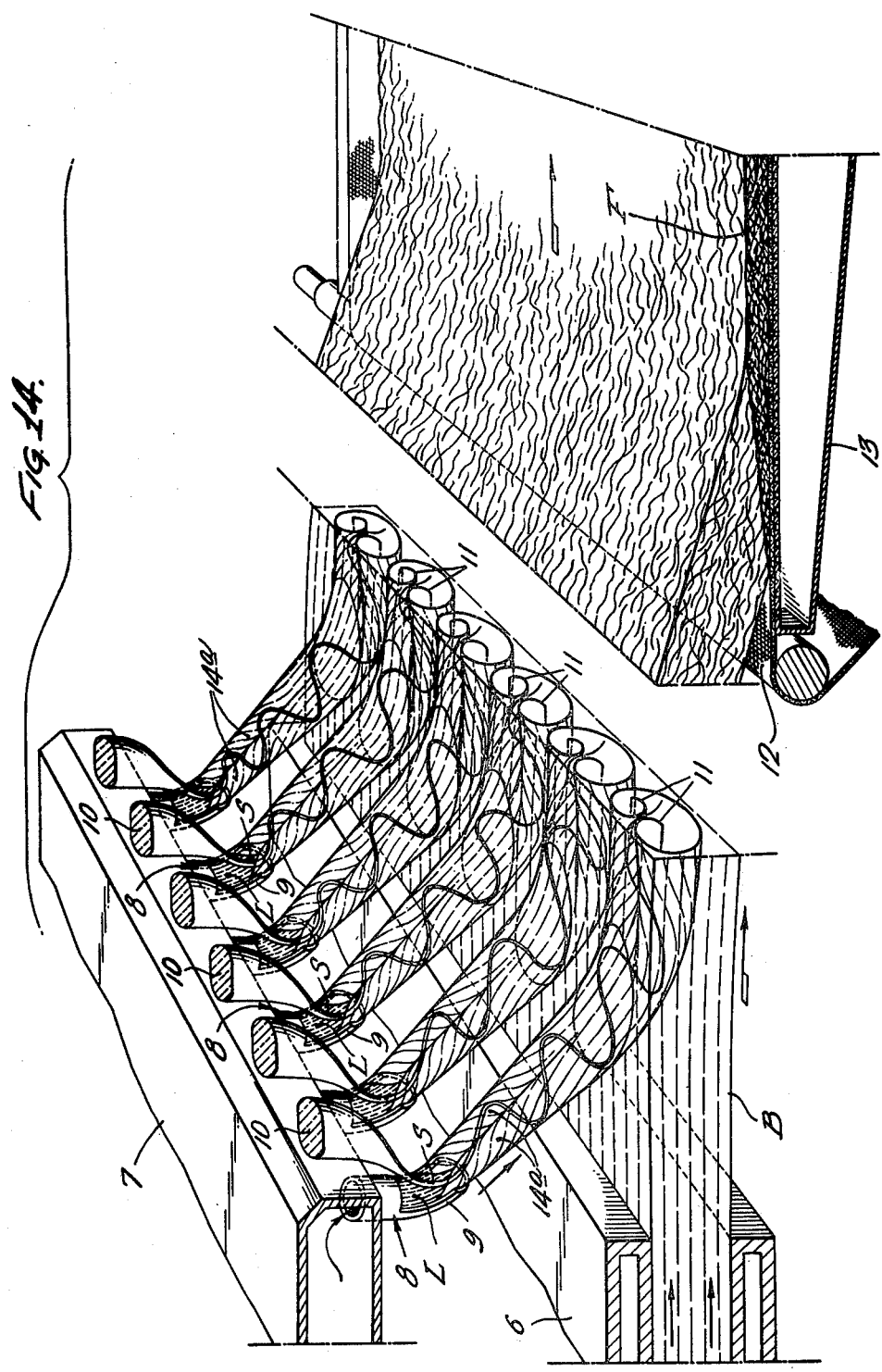

FIBER FORMATION BY USE OF GAS BLAST ATTENUATION

The present invention is a Continuation-in-Part of our prior application Ser. Nos. 834,543, 834,540 and 834,537, all filed Sept. 19, 1977 and of our application Ser. No. 780,589, filed Jan. 24, 1977 now U.S. Pat. No. 4,070,173 and of our application Ser. No. 762,789, filed Jan. 25, 1977; now U.S. Pat. No. 4,012,662 said applications 780,589 and 762,789 being Continuations-in-part of our prior application Ser. No. 676,755, filed Apr. 14, 1976; now U.S. Pat. No. 4,118,213, granted Oct. 3, 1978 and said application 676,755 being a Continuation-in-Part of our application Ser. No. 557,282, filed Mar. 11, 1975 (now U.S. Pat. No. 4,015,964), which in its turn is a Continuation-in-Part of our application Ser. No. 353,984, filed Apr. 24, 1973 (now U.S. Pat. No. 3,885,940). The subject matter of said U.S. Pat. No. 3,885,940 is also disclosed in the related Levecque and Battigelli Pat. No. 3,874,886.

Fiber formation from attenuable material by establishing a pair of counter rotating whirls or tornadoes, known as toration, is disclosed in all of our prior applications above identified. In that technique, a gaseous blast is generated and a gaseous jet, known as secondary or carrier jet, is also generated, the jet being of smaller cross section than the blast, being directed in a path transverse to the axis of the blast, and having higher kinetic energy per unit of volume than the blast so that the jet penetrates the blast. Such a jet penetrating a blast develops a zone of interaction of the jet and blast, which zone is characterized by the development of a pair of oppositely rotating tornadoes between which a zone of relatively low pressure occurs at the blast boundary adjacent to and downstream of the zone of penetration of the jet into the blast. In this toration technique, a stream of the attenuable material is delivered to the zone of low pressure, from which the attenuable material enters the zone of interaction between the jet and blast and is subjected to the high velocity currents of the whirls or tornadoes, thereby effecting attenuation of the stream and forming the fiber.

As disclosed in our prior U.S. Pat. No. 3,885,940 above referred to, the stream of attenuable material is delivered or introduced into the zone of interaction by the placement of a discharge orifice for the attenuable material at or substantially at the boundary of the blast. One of the objectives of the present invention is to provide for the separation of the discharge orifice for the attenuable material from the boundary of the blast and at the same time to provide for such separation while maintaining stable delivery of the attenuable material into the system. The manner in which this is accomplished will be developed more fully herebelow and is also disclosed in various of the other prior applications and patents referred to above.

In Ser. Nos. 834,543, 834,540, 834,537 and 762,789 above identified, the arrangement providing for maintaining stable delivery of the attenuable material into the system while at the same time providing for separation of the discharge orifice for the attenuable material from the boundary of the blast, includes the use of a guiding or deflecting element positioned along the path of the jet. In some of these arrangements, for instance in Ser. No. 762,789 a jet deflector is employed in a manner generating a pair of counter-rotating whirls or tornadoes having therebetween an area of substantially laminar flow also characterized by low pressure, with consequent pronounced induction of air, and in this type of arrangement, the attenuable material is introduced into the area or zone of low pressure, and stable delivery and feed of the attenuable material into the system is thereby provided.

The deflected jet flow retains sufficient kinetic energy to penetrate the blast and develops the desired zone of interaction in accordance with the toration technique described above.

In accordance with the practice of the present invention, the fiberizing centers not only include the jet guiding or deflector elements such as those above referred to, but in addition, provision is made for employment of a jet of relatively low temperature, for instance in the neighborhood or ambient temperature, this being of special importance in a technique employing a jet guiding or deflector element, because a high jet temperature tends to erode and/or cause warping of the deflector or guiding components. Certain jet temperature ranges, including temperatures approximating ambient are disclosed in our prior application Ser. Nos. 762,789, 676,755 and 780,589; and as is fully explained in our prior application Ser. No. 780,589, the employment of a relatively low jet temperature results in a jet of high density, in view of which, the desired ratio of kinetic energy of the jet in relation to the kinetic energy of the blast (required for penetration of the jet into the blast) may readily be maintained even with a jet velocity lower than that of the blast.

A more complete explanation of these factors and the parameters will be given hereinafter, following the description of several illustrative embodiments of equipment useable in the practice of the present invention.

Although the technique of the present invention is applicable to any attenuable material, it is particularly adapted to the attenuation of thermoplastic materials and especially thermoplastic mineral materials such as glass and similar compositions which are heated to the molten state or the molten consistency appropriate for attenuation. The embodiments illustrated and described hereinafter are particularly appropriate for use in the attenuation of glass or similar compositions, and where references are made to glass, unless otherwise indicated by the context, it is to be understood that any appropriate attenuable material may be used.

How the foregoing objects and advantages are attained will appear more fully from the following description referring to the accompanying drawings which illustrate three preferred embodiments of equipment according to the invention and also which diagrammatically represent significant portions of the action of the jet, blast and of the attenuating operation itself. In the drawings FIGS. 1 to 9 illustrate one embodiment of equipment and of these —

FIG. 1 is an outline overall elevational view with a few parts shown in vertical section showing the general arrangement of the major components of an equipment usable in accordance with the technique of the present invention;

FIG. 2 is an enlarged vertical sectional view of the components provided at one of the fiberizing centers, this view being taken as indicated by the section line 2—2 on FIG. 4;

FIG. 3 is a further enlarged fragmentary inverted plan view of some of the jet and glass orifices, this view being taken as indicated by the line 3—3 on FIG. 2;

FIG. 4 is an elevational view of portions of the equipment shown in FIGS. 1 and 2 and taken from the right of FIG. 2;

FIG. 5 is a plan view taken generally as indicated by the line 5—5 applied to FIG. 4;

FIG. 6 is an enlarged perspective view of a jet manifold box employed in the equipment shown in FIGS. 1 to 5;

FIG. 7 is a perspective diagrammatic view illustrating the operation of the equipment of this embodiment;

FIG. 8 is a cross sectional fragmentary and enlarged view of the equipment viewed as in FIG. 2, and illustrating certain phases of the activity of the blast and jet in effecting attenuation of the glass being delivered from the orifice at the top of the figure; and FIG. 9 is a plan view of several jets and of portions of the blast shown in FIG. 8, but omitting the glass feed and glass fibers being formed.

FIGS. 10 to 13 illustrate a second embodiment and of these —

Figure 10:
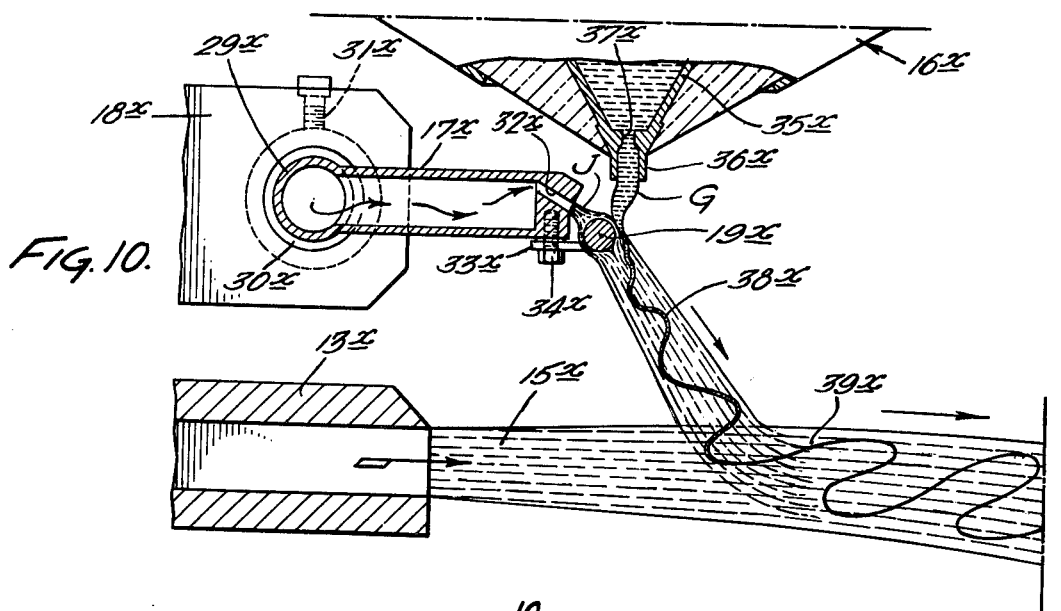
Figure 11:
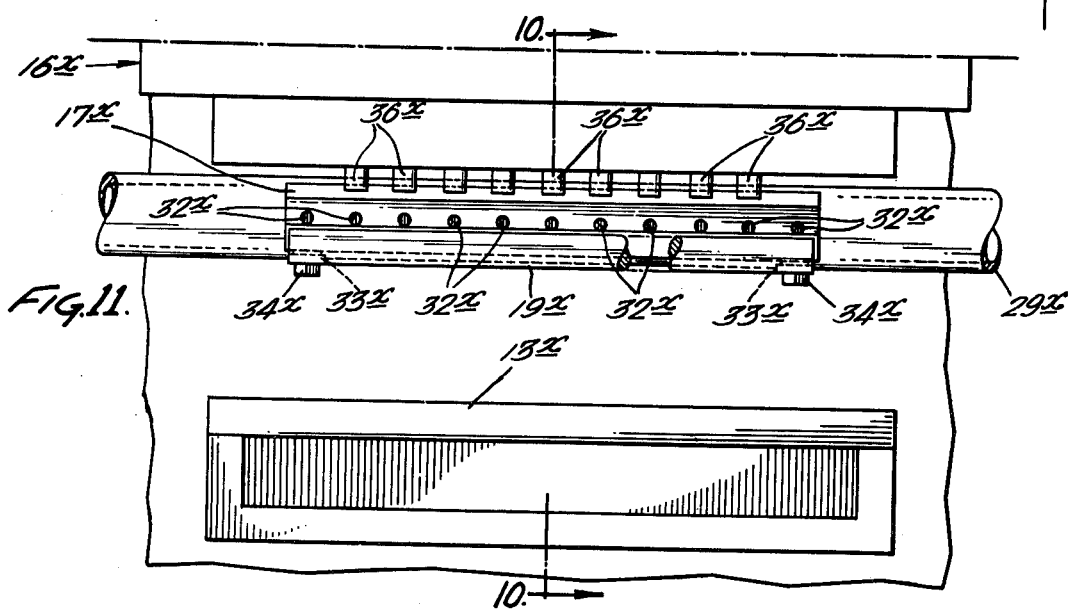
Figure 12:
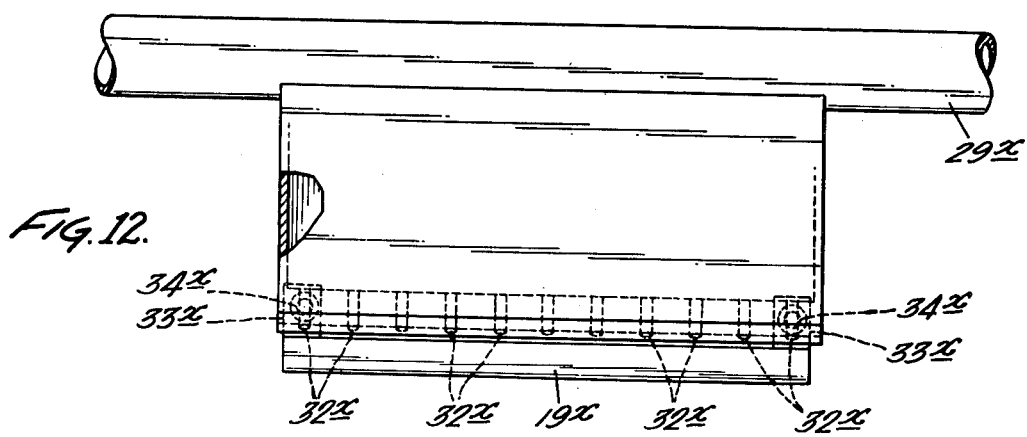

FIG. 10 is a somewhat diagrammatic vertical sectional elevation of the major fiber producing and fiber collecting components of a second embodiment of equipment usable in accordance with the invention, with certain parts shown in vertical section taken as indicated by the section line 10—10 on FIG. 11, this embodiment of the equipment also being disclosed in our application Ser. No. 834,540;

FIG. 11 is an elevational view of certain portions of the equipment shown in FIG. 10;

FIG. 12 is a plan view of some of the components shown in FIG. 11;

FIG. 13 is a perspective diagrammatic view illustrating the operation of the equipment shown in FIGS. 10, 11 and 12.

FIG. 14 shows a third embodiment of equipment useable according to the invention and is briefly described as follows:

FIG. 14 is a somewhat diagrammatic perspective view illustrating the operation of this third embodiment of equipment useable, with a portion broken out between the fiberization equipment and the fiber collecting equipment.

FIGS. 1 TO 9

This embodiment of the equipment is also disclosed in our application Ser. No. 762, 789 above identified.

Reference is first made to FIG. 1 which shows somewhat schematically the overall arrangement of the first embodiment of equipment adapted to carry out the technique of the present invention. Toward the left in FIG. 1 there is shown in outline at 15 a portion of a burner or blast producing structure having an associated nozzle 16 with a discharge aperture 17 of substantial width so as to deliver a blast 18 with which a plurality of fiberizing centers may be associated. A supply line for a gaseous fluid under pressure is indicated in FIG. 1 at 19 and this supply line is connected to jet manifold boxes 20 which cooperate in supplying the jet fluid to and through jet orifices, one of which appears at 21.

A bushing 22 associated with a forehearth or other appropriate glass supply means indicated at 23 is provided with glass orifice means indicated at 24, and the stream of glass is delivered into the flow of the jet to be described hereinafter and is carried downwardly to the zone of interaction in the blast 18. As will be explained, fiberization occurs in the jet and also in the blast, and as the blast delivers the fibers toward the right as viewed in FIG. 1, a fiber blanket indicated at 25 is laid down upon a perforated traveling conveyor or belt 26, having a suction box 27 below the upper run of the conveyor, the box 27 connecting with a suction fan diagrammatically indicated at 28 to assist in laying down the desired fiber blanket on the perforated conveyor 26.

Various of the fiberization parts are shown in greater detail in FIGS. 2 to 6 inclusive, to which reference is now made.

The blast and jet structures are advantageously adjustably mounted with respect to supporting structure such as diagrammatically indicated at 29, so that the relative vertical positioning of the blast and the jet may be altered, and preferably also so that the relative positioning of these parts may be adjusted in a direction upstream and downstream of the blast 18.

As seen particularly in FIGS. 4 and 5, the blast nozzle 16 is of substantial width, thereby providing for a wide blast delivery orifice 17. The bushing 22 for the supply of glass preferably also has substantial dimension in the direction perpendicular to the plane of FIG. 2 in order to provide for the supply of glass to a multiplicity of the glass delivery devices 24 as clearly appears in FIG. 4. Each of the delivery devices 24 has a metering orifice 24a and preferably also an elongated reservoir or cup downstream of the metering orifice as indicated at 24b (see particularly FIGS. 2 and 3). The reservoirs or cups 24b are desirably elongated in the plane of the fiberizing center, i.e. the plane containing the glass supply device 24 and its associated jet orifice 21.

The jet orifices 21 are provided in the front edge wall of each of a series of manifold boxes 20, four such boxes being provided in the equipment illustrated, and these boxes are mounted by means of mounting rods, including guide rods 30,30 mounted on the supporting structure 29 and which extend throughout the length of the bushing 23 and which pass through apertures 31 (see FIG. 6) on the mounting lugs 32 provided at each end of each of the jet manifold boxes 20. Thus, the several jet manifold boxes are mounted with freedom for shifting movement either to the right or left as viewed in FIGS. 4 and 5.

The positions of the jet boxes on the mounting guide rods 30 are determined by means of additional rods 33, 34, 35 and 36, each of which is threaded at its inner end, to cooperate with a threaded aperture in one of the lugs 32 of the guide boxes, one such threaded aperture appearing at 37 in FIG. 6. Each of the rods 33 to 36 is provided with a notched end 38 by means of which it may be rotated, and these adjustable rods are axially fixed, so that rotation thereof imparts a lateral adjustment or shifting movement to the associated jet manifold box 20.

By this arrangement, the relative positions of the jet orifices 21 with respect to the glass orifice devices 24 may be adjusted, and this may be used to compensate for thermal expansion and contraction of parts. Having the jet orifices distributed between a number of jet manifold boxes (four in the embodiment illustrated) provides for substantial alignment of the jet orifices with the glass orifices on lines paralleling the flow of the blast. Although the alignment may not be absolute, this is not necessary with equipment of the kind herein illustrated in which the glass streams are delivered into the substantially laminar flow zones between the tornadoes, such as 44b shown in FIG. 7, since as above brought out, delivery of the glass streams into these zones results in automatic compensation for slight inaccuracies in the relative positions of the jet and glass orifices.

Each of the boxes 20 is connected with the jet fluid supply line 19 by means of a pair of flexible connections 39 which permit adjustment of the position of the boxes 20 independently of the supply line 19.

As hereinabove indicated, it is contemplated according to the present invention that the jets delivered from the jet orifices 21 be subjected to the guiding action of certain elements or devices which cooperate with the jets in generating pairs of counter-rotating whirls or tornadoes which are utilized for preliminary attenuation of the streams of attenuable material and also for purposes of feed of the partially attenuated filaments into the zone of interaction provided by penetration of the jets into the blast, i.e. into the toration zones. For the purpose of developing counter-rotating pairs of tornadoes, the present invention contemplates the utilization of a guiding means, advantageously a common deflector plate 40 associated with a group of the jet orifices. Where the jets are subdivided into groups, and each group associated with a manifold box such as indicated at 20, each such box desirably carries a deflector plate 40. As seen particularly in FIGS. 7 and 8, the guide or deflector plate is desirably formed as a bent plate, one portion of which overlies and is secured to the jet manifold box and the other portion of which has a free edge 41 lying in a position in the path of flow or core of the jets delivered from the jet orifices 21, advantageously along a line intersecting the axes of the jet orifices.

As is graphically illustrated, particularly in FIG. 7, this position of the deflector plate 40 and its edge 41 results in impingement of each of the jets upon the underside of the plate 40 with consequent spreading of the jets. Thus, in FIG. 7, the flow of four of the jets originating from orifices a, b, c and d is shown, and it will be seen that as the edge 41 of the plate is approached, each of the jets spreads laterally.

It is contemplated that the jet orifices 21 be placed sufficiently close to each other and also that the deflector or guiding means be arranged so that upon lateral spreading, the adjacent or adjoining jets will impinge upon each other in the region of the edge 41 of the deflector plate. Preferably, the adjacent jets impinge upon each other at or close to the free edge 41 of the guide plate 40 as is shown in FIG. 7. This results in the generation of pairs of counter-rotating whirls or tornadoes which are indicated in FIG. 7 in association with each of the three jets delivered from the orifices a, b and c.

In analyzing the formation of these tornadoes, particular reference is made to those associated with the jet originating from orifice b in FIG. 7. Thus, it will be seen that tornadoes 42b and 43b, are generated and that these two tornadoes have their apices originating substantially at the edge 41 of the deflector 40 at opposite sides of the jet at the zone in which the spreading jet impinges upon the adjacent spreading jets delivered from orifices a and c. The tornadoes 42b and 43b are oppositely rotating as is indicated in FIG. 7, and the tornadoes enlarge as they progress, until they meet at a point spaced downstream from the edge 41 of the deflector. These tornadoes 42b and 43b also have currents in the downstream direction, as will be seen.

Because of the spacing of the apices or points of generation of the tornadoes 42b and 43b and because of the progressive enlargement of those tornadoes, a generally triangular zone 44b intervenes between the tornadoes and the edge 41 of the deflector plate, and this triangular zone is of relatively low pressure and is subjected to extensive inflow of induced air, but the flow in this zone is substantially laminar. This is the zone into which the stream of molten glass or other attenuable material is introduced into the system, and because of the character of this triangular laminar zone the stream of glass is not fragmented but is advanced as a single attenuating stream into the region between the pair of tornadoes.

Attention is now called to the fact that the directions of rotation of the currents in the tornadoes 42b and 43b are opposite, being clockwise for tornado 42b and counter clockwise for tornado 43b as viewed in FIG. 7. Thus, the currents in these two tornadoes approach each other at the upper side thereof and then flow downwardly toward the central or laminar zone 44b.

The directions of rotation just referred to are further indicated by arrows for the tornadoes 45a and 46a in connection with the corresponding pair of tornadoes associated with the jet delivered from the orifice a. It will be understood that in the illustration of the jet flow originating from orifice a, the flow has been shown as cut off or sectioned adjacent to the downstream end of the zone of laminar flow 44a, i.e. adjacent to the zone in which the pair of tornadoes have been enlarged and commence the mutual merging which occurs as the jet flow proceeds. With the illustration just referred to, it further clearly appears that the jet flow originating from orifice a not only includes the pair of tornadoes 45a and 46a but also includes another pair of tornadoes 47a and 48a, the directions of rotation of which are also opposite to each other, as shown in FIGS. 7 and 10, but in this case, the tornado 47a at the left, as viewed in FIG. 7, rotates in a counter clockwise direction, whereas the tornado 48a at the right rotates in the clockwise direction. It will be understood that similar duplicate pairs of tornadoes are generated by and associated with each of the jets. The origin of generation of the lower pair is somewhat different than the origin of generation of the upper pair as will be explained hereinafter with more particular reference to FIG. 8.

Still referring to FIG. 7, as the flow proceeds from the plane in which the tornadoes are illustrated for the jet delivered from orifice a, all four of the tornadoes tend to merge and reform a more generalized jet flow and this is indicated in FIG. 7 by a section 49c, representing a downstream section of the jet flow originating from orifice c. As will be seen, the whirling motions of the tornadoes are diminishing in intensity and the entire flow, including the laminar flow of the central zone of the jet, intermix with each other in the region indicated at 49c, and thereafter the jet progresses downwardly toward the blast which is indicated at 18 in FIG. 7 and referred to more fully hereinafter.

In the illustration of FIG. 7 it will be understood that for the sake of clarity, the showing of the various portions of the jet flow is somewhat schematic. For instance, in a zone spaced somewhat downstream of the points of origin, the pairs of tornadoes originating in one jet appear in the figure as being somewhat separated from the pair of tornadoes originating in adjoining jets, whereas, in fact, the tornadoes of adjoining jets would be substantially contiguous.

Turning now to the illustration in FIG. 8, it is assumed that the fiberizing center there shown is the center originating at the jet orifice b of FIG. 7. The tornado 43b is also there shown, as is the intervening laminar zone 44b. The lower pair of tornadoes originate in the region within or under the deflector plate 40, FIG. 8 being a sectional view showing only the lower tornado 48b, which originates behind the zone 44b. The direction of rotation of these lower tornadoes originated as a result of the combined action of the jet on the underside of the plate 40, together with induced air currents joining the jet stream, and it is here noted that the currents in the lower pair of tornadoes are of lesser intensity or velocity than the currents in the upper pair. Moreover, the direction of the currents flowing in the tornadoes of the upper pair has a dominate influence upon the action of the system when the stream of attenuable material is introduced first into the laminar zone and then into the jet flow downstream of the point where the tornadoes merge.

Because of the jet flow in the laminar zone and in the pairs of tornadoes, particularly the upper pair of each group, the introduction of the stream of attenuable material, which is indicated in FIG. 7 at S for the fiberizing center including the jet orifice b, results in the progression of the stream into the laminar flow of the central zone. This carries the stream into the zone of high velocity lying between the pairs of tornadoes and, in consequence, the stream is attenuated as is shown in FIG. 7. It is found that this attenuation occurs substantially within a planar zone indicated in FIG. 7 at P. The action of the pairs of tornadoes causes a whipping of the attenuated fiber substantially within the planar zone P, so that this attenuation does not result in projection of the fibers being formed laterally toward the adjoining jets.

Further jet flow causes the jet, together with the attenuating fiber carried thereby, to penetrate the upper boundary of the blast 18, the jet flow still retaining sufficient kinetic energy to effect such penetration of the blast, and thereby initiate a second phase of fiberization which proceeds or is effected, in accordance with the principles fully explained in the prior applications referred to above. Indeed, in the region of penetration of the jets into the blast, the flow and velocity of each jet is still sufficiently concentrated near the center of each jet so that each jet acts individually to develop a zone of interaction in the blast. Thus, from FIG. 7 it will be noted that in the zone of interaction, i.e. in the toration zone, a pair of oppositely rotating whirls or tornadoes indicated at TT, are generated, thereby developing the currents which cause further attenuation of the fiber being formed. The fiber is thereafter carried by the combined flow of the jet and blast to a suitable collection means, for instance a travelling perforated conveyor such as indicated diagrammatically at 26 in FIG. 1.

As will be understood, both in the laminar zone adjacent to the edge of the deflector and also as the jet flow progresses downstream, air is induced, and this induction of air is clearly indicated by arrows applied to the jet flow in FIG. 7. Such induction of air currents is also clearly indicated in FIG. 8.

Having in mind the foregoing description of the general nature of the equipment and operation contemplated according to the present invention, attention is now called to certain permissible variations and ranges of operating conditions which may be employed.

First with regard to the relative positioning of the jet orifices and the guiding or deflecting means, such as the guiding plate 40, it is contemplated that the arrangement of the jets and the guiding plate should provide for spreading of the jets so that adjacent jets impinge upon each other substantially at the edge of the guide plates. This is the condition illustrated in FIG. 7 and it will be noted that with this arrangement, the points of origin or the apices of the upper pairs of tornadoes are at the edge 41 of the guide plate 40.

The jets and the guide plate may be arranged so that the jets impinge upon each other at points somewhat upstream or downstream of the edge of the guide plate, but it is preferred that the impingement of adjacent jets upon each other be maintained quite close to, but not necessarily precisely on, the edge of the plate, because in this condition, maximum stability of the tornadoes is attained, with consequent maximum stability of the intervening laminar zone of the jet. In turn, the stability of the laminar zone is important in the stabilization of the glass feed into the system.

If the point of impingement of adjacent jets is spaced appreciably downstream of the edge of the guide plate, the tornadoes become unstable because their apices originate in free space rather than at the edge of the plate. When the apices of the tornadoes originate in free space, they are subject to fluctuations by stray gas currents and in consequence tend to shift in position; but if the apices originate at or substantially at the edge of the deflector plate they are less sensitive to stray currents and, indeed appear to "attach" themselves to the edge of the plate in a stable position.

On the other hand, if the adjacent jets impinge upon each other at a point spaced appreciably upstream of the edge of the guide plate, the formation of the tornadoes is impaired because the guide plate itself prevents proper formation of the tornadoes.

It is also of importance in providing for generation of the upper pair of tornadoes at the edge 41 of the guide plate, that the edge 41 be located at or approximately at the central axis of the jet. If the edge of the guide plate is raised substantially, the deflection is correspondingly diminished or even eliminated, in which event no tornadoes will be generated. On the other hand, if the edge of the deflector is located excessively low, for instance below the lower boundary of the jet, there is a tendency for the tornadoes to diminish in their organization and provide only for uniform or parallel flow throughout the entire section of the jet, rather than for the desired higher velocity helical or vortical flow of the tornadoes.

The generation of the tornadoes under the most favorable conditions, i.e. under the conditions in which the apices are "attached" to the edge of the deflector, produces the most stable tornadoes and thus also the most stable operating conditions with respect to the feed of the glass stream and its attenuation in the planar zone P above described.

FIGS. 10–13

This embodiment of the equipment useable according to the invention is also disclosed in our application Ser. No. 834,540.

A blast delivery means is indicated at 13x, this device being associated with the burner or blast generator as in the first embodiment. The principal jet or blast 15x is delivered from the device 13x in a generally horizontal direction below a glass supply means indicated in outline at 16x. Secondary or carrier jets are delivered from nozzles or orifices associated with the gas supply tube 29x which is mounted upon brackets 18x. The secondary jets are directed toward the deflector element indicated at 19x and the carrier jets are thereby deflected in a downward direction to penetrate the blast 15x and develop zones of interaction. Individual streams of glass are supplied from the supply means 16x and these streams are delivered to the secondary jets and are carried thereby into the zone of interaction with the blast, with resultant fiberization. The merged current of the jets and blast, together with the attenuated fibers may be collected on a foraminous conveyor in the manner illustrated in FIG. 1.

The gas supply tube 29x are supported by means of sockets 30x which in turn, are connected with the brackets 18x. In this way, the jet supply device 17x may be angularly shifted upwardly or downwardly about the axis of the tube 29x and may be fixed in any desired position, for instance by set screws such as indicated at 31x.

In addition to this angular upward and downward movement of the jet supply device 17x, the mounting arrangement just described also provides for lateral shifting movement or adjustment of the device 17x in a direction paralleling the axis of the tube 29x. This adjustment is provided for accurate alignment of the carrier jets with respect to the glass orifices to be described hereinafter.

The device 17x, in effect, comprises a manifold for feeding the individual jet orifices indicated at 32x, there being 11 of such orifices in the embodiment here illustrated. As clearly appears in FIG. 10, the jet orifices have their axes inclined downwardly to the right toward the surface of the deflector 19x. In this embodiment, the deflector 19x takes the form of a cylindrical rod having a surface convexly curved about an axis transverse to the streams of attenuable material. This rod has mounting tabs 33x secured to opposite ends thereof and connected with the body of the jet supply manifold 17x by means of bolts 34x.

The glass supply means 16x includes a bushing 35x with a series of glass delivery devices 36x, each of which is fed by a metering orifice 37x. The glass is thus supplied in a series of streams or glass bulbs G to the secondary jets in which the streams are partially attenuated, as indicated at 38x in FIG. 10, and the partially attenuated streams enter the zone of interaction of the jets with the blast, with resultant additional attenuation as indicated at 39x in FIG. 10. From FIG. 11, it will be observed that there are nine glass delivery devices 36x, and that the total number (eleven) of jet orifices 32x is greater than the number of glass delivery orifices so that an "outboard" jet may be positioned at each end of the series, in order to provide uniform fiberizing conditions for each of the nine glass streams employed in this embodiment.

The fiberizing operation provided by the equipment described above in relation to FIGS. 10 to 12 is illustrated schematically in FIG. 13. In considering this figure, it is first pointed out that the cylindrical deflector or rod 19x is shown as positioned with its axis offset somewhat downwardly from the axes of the individual secondary jets delivered from the jet orifices 32. This positioning is clearly shown in connection with each of a series of four of the secondary jets J1, J2, J3 and J4. As seen in FIGS. 10 and 13, the flow of each of the carrier jets J is divided into upper and lower portions, the upper portion flowing around the upper surface of the rod 19x and the lower portion around the lower surface of the rod 19x. Where the jets first impinge upon the surface of the rod 19x, the surface of the rod acts to spread the jet flow and as the jet flow passes beyond the mid region of the rod the jet flow is influenced by a Coanda effect, causing the jet flow to follow the surface of the rod. This brings the two divided portions of the jet flow together again, as appears in FIGS. 10 and 13.

In the embodiment as shown, the center of the rod 19x is positioned below the axis of the jet orifices, and because of this, the upper portion of the jet flow is of larger section than the lower portion, and this is desirable for reasons which will appear as this description proceeds. The portions of the secondary jet flow above and below the rod 19x merge with each other in a position toward the side of the rod 19x generally opposite to the jet orifice 32x. In the embodiment as shown, the offset of the rod below the axes of the jets results in downward deflection of the overall jet flow path. It is also possible to position the rod with its axis in direct alignment with the axes of the jets, in which case the jet flow will leave the rod in a direction aligned with the axes of the jets.

As best seen in FIG. 13, the jet flow from each of the orifices 32x also spreads laterally or diverges in the axial direction of the deflector 19x, and with appropriate spacing of the jets, the lateral spreading or divergence results in impingement of adjoining jets upon each other, and this occurs as the upper and lower portions of the jets flow around the upper and lower surfaces of the rod 19x.

This lateral impingement of the adjoining jets upon each other results in the development of pairs of counter-rotating whirls or tornadoes which have their points of origin or apices at the surface of the rod 19x. Two pairs of tornadoes develop from the flow of each jet. Thus, an upper pair 40a and 40b develop from the portion of the jet flow which passes over the upper surface of the rod 19x, and a lower pair 41a and 41b develop from the portion of the jet flow which passes under the lower surface of rotating, the directions of rotation of the upper pair being downwardly at their adjoining sides and upwardly at their outer sides, as indicated by arrows. On the other hand, the directions of rotation of the tornadoes of the lower pair is upwardly at their adjoining sides and downwardly at their outer sides, as is also indicated by arrows.

Because of the positioning of the guide rod 19x in offset relation to the axes of each jet, the portion of the flow with the resultant tornadoes above the rod is larger and therefore more effective than the portion of the flow and tornadoes below the rod.

The rod 19x acts to develop areas of substantially laminar flow on the upper side of the rod between the upper pair of tornadoes 40a and 40b of each jet. Each of these areas of laminar flow is generally triangular in shape, because the upper pair of tornadoes increase in size in the downstream direction of the flow. Indeed, the upper pair of tornadoes increase in size until they merge, as is clearly indicated in FIG. 13. The lower pair of tornadoes also increase in size and ultimately merge, as will also be apparent in FIG. 13 from the tornadoes illustrated as associated with the jet J1. As the jet flow including the associated tornadoes progresses still further, the tornadoes tend to lose their identity, as is indicated by the section of the jet flow originating from the jet J3 in FIG. 13. The merged flow of each jet, including the pairs of tornadoes originating with that jet, retain sufficient kinetic energy per unit of volume in relation to the kinetic energy of the principal blast, to cause penetration of the principal blast 15x, and this penetration of the blast by each jet creates a zone of interaction of the type fully explained in our issued U.S. Pat. No. 3,885,940 above identified. Such a zone of interaction is characterized by the development of a pair of counter-rotating whirls or tornadoes 42x (see FIG. 13). Indeed, in the region of penetration of the jets into the blast, the flow and velocity of each jet is still sufficiently concentrated near the center of each jet so that each jet acts individually to develop a zone of interaction in the blast.

The flow of the secondary jets J1, J2, etc. is utilized to effect fiber formation, from the streams of the attenuable material, such as glass. The feed of this material is effected by the development of glass bulbs such as indicated at G, which are discharged from the devices 36x, and from which individual streams of glass are delivered into the laminar flow areas of the jets lying between the pairs of upper tornadoes, as is clearly shown in FIG. 13. Because of the flow characteristics in this region above the guide rod 19x, a very substantial air induction occurs, as is indicated by the arrows in FIG. 13 in association with the flow of jet J2. The induced air assists in drawing a stream of the glass from each glass bulb G and delivering that stream in a stable manner into the zone of laminar flow between the pair of tornadoes of each fiberizing center. The whirling currents of the tornadoes then advance the stream and initiate the attenuation thereof, as is indicated at 38x in FIG. 13.

The partially attenuated fiber, together with the jet flow, then progresses downwardly to penetrate the blast 15x and thereby deliver the partially attenuated fiber into the zone of interaction between the jet and the blast, and in this zone or region the additional counter-rotating tornadoes 42x—42x effect further attenuation of the fiber, as shown at 39x, which may then be delivered to a collection system, for example in the manner illustrated in FIG. 1.

The system described above is of advantage in providing for separation of the major components of the fiberizing equipment, especially in providing for separation of the glass supply means from the principal attenuating blast and also in providing for separation of the means for generating the jets from the means for generating the blast. Separation of the major components is advantageous for a number of reasons, including the fact that the maintenance of the desired temperature of each of the components is more readily achieved where the components are spaced from each other than where they are close to each other and thus tend to effect heat transfer from one component to another. However, it is of importance in such fiberization systems that the streams of the attenuable material be fed in accurately controlled positional relation to the individual zones of interaction in the principal attenuating blast. The systems herein disclosed, result in accurate feed of the attenuable material notwithstanding the separation, because the pairs of tornadoes associated with each carrier jet develop in a manner providing for stability of the jet flow. It will be observed that the points of origin or apices of the tornadoes are located on the surface of the cylindrical guide rod 19x. The apices of the tornadoes are thus, in effect, "attached" to the cylindrical surface of the guide rod 19x and are therefore stabilized in position. The tornadoes are therefore much more stable than would be the case if the apices were generated in free space. The factors referred to above result in high stability of feed of the glass or other attenuable material into the toration zones in the blast.

Moreover, even some lateral misalignment of the glass bulbs G with relation to the individual jet nozzles 32x will be automatically compensated as a result of the induced air currents associated with the laminar flow area of the jet lying between the pair of upper tornadoes. This aids in stabilizing the feed of the glass into the laminar zone of the jet flow, and this in turn will also increase the stability of the feed of glass by the jets into the toration zones.

From the above it will be seen that in the embodiment of the apparatus shown in FIGS. 10 to 13, jet deflector or guiding means is also used, as in the embodiment of FIGS. 1 to 9. Before more fully considering the preferred jet temperatures, reference is first made herebelow to a third embodiment illustrated in FIG. 14.

FIG. 14

The general arrangement of the equipment of this embodiment will be apparent from the somewhat diagrammatic illustration of FIG. 14, particularly when taken with the following description. Further details may be derived from the disclosure in our copending application Ser. No. 834,543.

A blast delivery device is indicated at 6. This may comprise a delivery nozzle associated with a burner, thereby delivering a hot gaseous blast of the products of combustion, the blast being indicated at B. The blast is desirably of greater width or transverse dimension than the jets to be described below.

A manifold 7 for supplying the gas for the jets, for instance compressed air, is arranged in spaced relation to the blast delivery device and a series of jet delivery devices 8 are associated with orifices in the jet manifold 7.

Each of the devices 8 is conveniently formed of a bent tube or elbow, of either constant or varying radius, one end of which is secured in an orifice in the manifold wall. The concave portion, for instance about one-half of the elbow is cut away or removed, thereby leaving a trough shaped delivery and deflecting device 9.

A glass bulb or cone 10 is associated with each of the jet delivery devices, the glass cone being delivered from an appropriate supply device, for example of the kind shown in various of the figures already described.

From the above it will be seen that each fiberizing center includes a jet delivery device and a glass delivery device associated with each other and in addition associated with the blast, and each one of the fiberizing centers operates to produce a single filament.

Because of the curvature of the jet delivery device 9 and because of the shielding of the lateral sides of the jet in the trough of the element 9, there is a tendency to develop whirling currents or tornadoes adjacent the opposite sides of the concave trough 9, as is fully explained in our companion application Ser. No. 834,543 already mentioned. The tornadoes, indicated at 14a, have their apices or points of origin adjacent the side walls of the concave trough of the device 8, and the tornadoes develop and enlarge in the downstream direction, progressively merging with the intermediate laminar flow portion L of the jet. The zone of substantial laminar flow is characterized by pronounced inflow of induced air, and this air induction tends to draw the stream of glass from the bulb or cone 10 and to cause that stream to enter the jet flow in the laminar flow region between the tornadoes.

Induction of air into the jet continues and the jet flow then proceeds downstream at an inclined angle as illustrated in FIG. 14 so that each jet meets and penetrates the blast B, with resultant toration or attenuating action.

As above mentioned, the stream of glass enters the zone of laminar flow of the jet intermediate the tornadoes developed in the jet flow, this entry of the stream being indicated at S in FIG. 14. The stream is then advanced by the action of the tornadoes and is in fact subjected to a preliminary attenuation by the jet action in the zone between the pair of tornadoes, thereby progressively diminishing the size of the stream to form a filament. The entry of the glass stream S into the zone of substantially laminar flow is of advantage for several reasons including the fact that the absence of turbulence in the zone into which the glass is introduced diminishes tendency to fragment the glass stream, and thereby assists in producing filaments or fibers of substantial length. In addition, the induced air currents in the region of the zone of laminar flow tend automatically to draw the glass stream into the mid region between the tornadoes, and this tendency is of sufficient magnitude to automatically compensate for some misalignment of the glass delivery orifice in relation to the jets.

As seen in FIG. 14, a second stage of attenuation occurs as a result of the penetration of the jet into the blast, thereby establishing a zone of interaction in which the attenuation occurs in consequence of toration, such toration being extensively analyzed and considered in various of the parent applications and patents above identified, especially in the U.S. Pat. No. 3,885,940 and also in copending application Ser. No. 762,789.

For the purpose of effecting toration, the jet is directed toward and penetrates the blast. Such penetration occurs in consequence of employment of a jet having a kinetic energy per unit of volume which is greater than that of the blast. In addition, the cross section or at least the cross sectional dimension of the jet should be smaller than that of the blast in a direction transverse of the blast. The dimensional and kinetic energy relationships just referred to, should exist at the zone of penetration of the jet into the blast, and since, in accordance with the present invention, the jet flow at the time of penetration into the blast is made up of the merged tornadoes 14a and the induced air, it is necessary to employ jets of higher kinetic energy at the point where the jet is discharged through the orifice in the wall of the jet manifold 7.

As explained in the parent patent and application last referred to, the penetration of the jet flow into the blast results in the development of a pair of tornadoes which appear in FIG. 14 at 11 in the region where the jet and blast have been broken out. The pairs of tornadoes 11 are also counter-rotating in the senses indicated in FIG. 14, and at each fiberizing center, the partially attenuated stream or filament is subjected to an additional attenuating force under the influence of the high velocity currents associated with the tornadoes 11, thereby effecting a second stage of attenuation and producing a fine fiber.

The fibers produced in this way as a result of the action of the several fiberizing centers in an installation such as diagrammatically illustrated in FIG. 14 are appropriately collected, for instance by being laid down on a perforated fiber collector such as indicated at 12 in FIG. 14. This conveyor travels over one or more suction boxes such as shown in 13 in consequence of which the fibers are laid down as a fiber blanket or mat F on the moving conveyor 12 in the general manner illustrated in FIG. 14 and more fully described in various of applicants' prior applications and patents.

JET TEMPERATURE

It will be noted that in each of the three illustrative embodiments of equipment which may be used in the practice of this invention, each jet comes into contact with a guiding or deflecting element or component in the jet path between the jet discharge orifice and the blast. In each case the guided or deflected jet also penetrates the blast to effect toration and for this purpose the jet must have kinetic energy per unit of volume greater than that of the blast. While such kinetic energy may be provided with a jet of high temperature and high velocity, high temperature and high velocity detrimentally affect the guiding or deflecting elements and result in erosion and undesirable thermal expansion and contraction of such guiding and deflecting elements.

The present invention therefore contemplates combined use of jet guiding or deflecting elements while at the same time employing jets of relatively low temperature and velocity.

The lower temperature and velocity contemplated by the present invention still provides the required kinetic energy ratio between the jet and blast, i.e., a jet having kinetic energy higher than that of the blast so that the jet will penetrate the blast and create a zone of interaction. The reason why this desired kinetic energy ratio is still present with the lower velocity of the jet is because of the higher density of the jet fluid at the lower temperature. The density, of course, increases with decrease of temperature and since the kinetic energy is determined not by the velocity alone but also by the density of the jet fluid, a jet may readily be provided having a higher kinetic energy per unit of volume than the blast, even at velocities lower than the velocity of the blast.

By employing the lower jet temperature (for instance) a temperature approximating ambient or room temperature) a number of advantages are attained. In the first place when utilizing such temperature for the jet, the erosion and warpage problems of the jet guiding or deflecting elements are extensively reduced or even eliminated. In addition it becomes feasible to employ a commonly available source of compressed air as the source of fluid for the jet. The lower temperature also makes it practical to use commonly available materials, such as stainless steel both for the jet generating device and the guiding or deflecting elements, rather than more sophisticated and expensive materials, such as platinum alloys or ceramics, which are needed where very high temperature jets are used.

Still further, the use of the lower temperatures for the jet facilitates introducing the fiber being formed into a relatively cool environment as soon as the fiber is attenuated, this consideration being of importance in the toration technique, for reasons which are fully brought out in our prior patent above referred to.

It is also to be kept in mind that by employing a jet fluid at a temperature approximating ambient or room temperature, consumption of energy to heat the jet is eliminated.

In connection with the above it is pointed out that a jet of adequate velocity is readily obtained when using a source of compressed air as the source of the jet fluid. This is in distinct contrast to the employment of relatively high jet temperatures, with which it is technically more difficult to obtain high velocity, and because of the lower density of the fluid at high temperature it is therefore much more difficult to attain sufficient velocity to achieve the kinetic energy ratio required to effect penetration of the jet into the blast.

As above noted, it is convenient to employ jet temperatures near ambient or room temperature, but it will be understood that the jet temperature need not necessarily be as low as ambient or room temperature. Preferably the jet temperature is well below the softening point of the thermoplastic material being attenuated, and in the case of attenuation of glass or similar mineral materials, the jet temperature is preferably selected at a value below 200° C., and most desirably below 100° C., and this is particularly true where jet guiding or deflecting elements are employed, as is contemplated according to the present invention.

Further with respect to the temperatures and velocities of the jet and blast which are contemplated according to the present invention, it is pointed out that in the toration of thermoplastic materials such as glass, it is desirable to employ a blast temperature at least as high as a temperature approximating the lower end of the softening range of the thermoplastic material to be attenuated. Maintenance of such a temperature is desirable because substantial attenuation is desired within the blast. Thus, with most glass formulations and with similar types of thermoplastic mineral materials (either naturally occurring or synthetic), the lower end of the softening range is between about 600° C. and 900° C. With most of such materials it is preferred to employ a blast having a temperature of at least 1000° C. Although the blast temperature may be higher that just indicated, it is desirable to avoid excessive temperature because, if the temperature is too far above the softening range, the attenuation will be adversely affected, with resultant fragmentation of the fibers, or formation of slugs or shot.

Blast temperatures of the order of magnitude just referred to are advantageously achieved by employment of a gaseous fuel burner, and the utilization of the gaseous products of combustion as the blast.

In contrast with the foregoing, it is advantageous for various reasons already noted above to employ a jet of much lower temperature. The jet therefore need not be produced by the combustion of fuel, with resultant unnecessary fuel and energy consumption, but in contrast a common source of compressed air may be utilized for the supply of the jet gas, thereby providing a jet at a temperature near ambient or room temperature. Some variation from ambient temperature may be employed, as may result for example from action of a compressor, or by exposure of a storage tank to other equipment or atmospheric conditions tending to either raise or lower the temperature somewhat with respect to ambient. For most purposes, a jet temperature below about 100° C. is useable and would be available from various forms of compressed air systems in common use.

With the temperature relationship of the jet and blast above referred to, it is contemplated that the velocities of the jet and blast be such that the kinetic energy of the jet per unit of volume should be higher than that of the blast, so that the jet will penetrate the blast and thereby provide the desired toration zone or zone of interaction. With a gaseous jet at a temperature near ambient or room temperature, the density of the air or gas of the jet is much higher than would be the case with products of customary combustion of fuel with air at temperatures of the order of those contemplated for use for the blast. In view of this, the desired kinetic energy of the jet may be obtained while still utilizing a jet velocity even well below the velocity of the blast. Indeed, in a typical case with blast velocities of the order of 200 m/sec to 800 m/sec, which is a suitable range as already indicated hereinabove, the jet velocity may even be lower than the blast velocity. This in turn makes possible a further economy in that it is not necessary, (in order to provide the desired kinetic energy ratio and thus achieve penetration of the jet into the blast) to impart high velocity to the jet.

With a blast comprising products of combustion at a temperature above about 1000° C. and a velocity in the range from about 250 m/sec to 800 m/sec, and within a jet comprising air (or a gas of similar density) at a temperature below about 100° C., the desired predominance of kinetic energy of the jet over the blast can be attained by employment of a jet velocity less than about that of the blast, for instance in the range of from about 200 m/sec to about 400 m/sec. It will be understood that the jet velocities referred to are related to the jet velocity at a point downstream of the guiding or deflecting element, as the jet approaches the blast.

We claim:

1. A method for forming fibers from attenuable thermoplastic material comprising delivering a stream of the material downwardly from a supply orifice, generating a gaseous blast spaced below the supply orifice, developing a gaseous jet of smaller cross section than that of the blast directed in a path toward the stream between the supply orifice and the blast, and deflecting the jet from said path into a path extended downwardly toward the blast by interposing a deflector element between the jet and the stream, the stream being delivered to the deflected jet, and the jet being of temperature and velocity below that of the blast, but having density and thus kinetic energy per unit of volume higher than that of the blast thereby providing for penetration of the jet into the blast.

2. A method as defined in claim 1 in which the thermoplastic material has a softening range above 600° C., in which the jet has a temperature lower than 200° C. and in which the blast has a temperature above 1000° C.

3. A method for forming fibers from attenuable thermoplastic mineral material comprising generating a gaseous blast, generating a gaseous jet, establishing a stable low pressure zone in the jet by interposing a structural element in the jet flow, the jet flow having a velocity lower than that of the blast but having a temperature and thus a density providing kinetic energy per unit of volume higher than that of the blast and being directed transversely into the blast to establish a toration zone therein, and delivering a stream of attenuable material into the influence of the gases induced by the jet into said low pressure zone so that the stream of attenuable material is carried by the jet into said zone of interaction.

4. A method as defined in claim 3 in which the establishment of the low pressure zone in the jet is effected by interposing a deflector in the jet flow providing for deflection of the path of the jet flow.

5. A method as defined in claim 3 in which the temperature of the jet approximates ambient temperature.

* * * * *

UNITED STATES PATENT AND TRADEMARK OFFICE
CERTIFICATE OF CORRECTION

PATENT NO. : 4,146,378
DATED : March 27, 1979
INVENTOR(S) : Marcel Levecque, Jean A. Battigelli and Dominique Plantard It is certified that error appears in the above-identified patent and that said Letters Patent are hereby corrected as shown below:

In the Title Page, between the information of Items [63] and [52], information concerning French Priority Dates should be inserted, as follows:

--Foreign Application Priority Data

August 23, 1977 France.......77.25693
August 23, 1977 France.......77.25690
August 23, 1977 France.......77.25692
December 16, 1976 France.....76.37784--.

Signed and Sealed this

Thirty-first Day of July 1979

[SEAL]

Attest:

LUTRELLE F. PARKER

Attesting Officer    Acting Commissioner of Patents and Trademarks